United States Patent
Freund et al.

(10) Patent No.: US 10,394,408 B1
(45) Date of Patent: Aug. 27, 2019

(54) RECOMMENDING MEDIA BASED ON RECEIVED SIGNALS INDICATING USER INTEREST IN A PLURALITY OF RECOMMENDED MEDIA ITEMS

(71) Applicant: Google LLC, Mountain View, CA (US)

(72) Inventors: Martin Brandt Freund, Mountain View, CA (US); Jason Robert Richard Sanio, Mountain View, CA (US)

(73) Assignee: Google LLC, Mountain View, CA (US)

( * ) Notice: Subject to any disclaimer, the term of this patent is extended or adjusted under 35 U.S.C. 154(b) by 566 days.

(21) Appl. No.: 13/928,945

(22) Filed: Jun. 27, 2013

(51) Int. Cl.
*G06F 3/048* (2013.01)

(52) U.S. Cl.
CPC .................... *G06F 3/048* (2013.01)

(58) Field of Classification Search
CPC ............................ H04N 21/4826; G06F 3/048
USPC ........................................................ 715/719
See application file for complete search history.

(56) References Cited

U.S. PATENT DOCUMENTS

| | | | | |
|---|---|---|---|---|
| 8,365,097 B2 * | 1/2013 | Jager | ..................... | G06F 3/0482 715/810 |
| 2002/0154157 A1 * | 10/2002 | Sherr | ..................... | G06F 21/10 715/716 |
| 2005/0097098 A1 * | 5/2005 | Mazner | ................ | G06F 17/3061 |
| 2006/0173838 A1 * | 8/2006 | Garg | ....................... | G06Q 30/02 |
| 2006/0178947 A1 * | 8/2006 | Zsigmond | ................. | B07C 5/34 705/26.1 |
| 2008/0086747 A1 * | 4/2008 | Rasanen | ............ | H04N 21/4828 725/46 |
| 2008/0091721 A1 * | 4/2008 | Harboe | ................. | G06F 3/0482 |
| 2008/0270250 A1 * | 10/2008 | Bolivar | .................. | G06Q 30/02 705/26.1 |
| 2009/0089327 A1 * | 4/2009 | Kalaboukis | ....... | G06F 17/30053 |
| 2010/0031162 A1 * | 2/2010 | Wiser | ................. | G06Q 30/0255 715/747 |
| 2010/0031366 A1 * | 2/2010 | Knight | .................. | G06Q 10/10 726/26 |
| 2011/0289139 A1 * | 11/2011 | McIntosh | ............. | H04N 21/252 709/203 |
| 2012/0079427 A1 * | 3/2012 | Carmichael | ......... | G06F 3/04817 715/825 |
| 2012/0089911 A1 * | 4/2012 | Hosking | ........... | G06F 17/30743 715/716 |
| 2013/0212493 A1 * | 8/2013 | Krishnamurthy | ..... | H04L 65/403 715/753 |
| 2014/0003797 A1 * | 1/2014 | Oliver | ................ | H04N 21/4334 386/292 |

(Continued)

*Primary Examiner* — Doon Y Chow
*Assistant Examiner* — Conrad R Pack
(74) *Attorney, Agent, or Firm* — Byrne Poh LLP

(57) ABSTRACT

Systems and methods for recommending media based on received signals indicating user interest in a plurality of recommended media items are presented. In one or more aspects, a system is provided that includes a recommendation component configured to analyze a set of videos and identify a first subset of videos to recommend to a user, wherein respective representations of the videos included in the first subset are presented to a user via a user interface displayed at a client device. The system further includes a selection component configured to receive input regarding user interest in two or more videos included in the first subset of videos. The recommendation component further identifies a first subset of the two or more videos for re-recommending to the user based on the received input.

12 Claims, 12 Drawing Sheets

(56) References Cited

U.S. PATENT DOCUMENTS

2014/0059231 A1\* 2/2014 Choi ................ H04L 47/70
709/226
2014/0075316 A1\* 3/2014 Li .................. G06F 17/30029
715/719

\* cited by examiner

RECOMMENDING MEDIA BASED ON RECEIVED SIGNALS INDICATING USER INTEREST IN A PLURALITY OF RECOMMENDED MEDIA ITEMS

TECHNICAL FIELD

This application generally relates to systems and methods for recommending media based on received signals indicating user interest in a plurality of recommended media items.

BACKGROUND

The proliferation of available streaming content is increasing at exponential levels that will soon reach many millions if not billions of such viewable streaming content. Conventionally, broadcast media has been provided by television or cable channels that typically have been provided by a relatively small number of content providers. However, with the ubiquitous nature of media creation and publishing tools, individuals are able to become productive content creators. This has resulted in substantial growth of available streaming content as well as channels for streaming content. Although users enjoy a plethora of viewing options associated with streaming content, the task of searching through this sea of content to find items of interest is becoming increasingly difficult. Accordingly, mechanisms for automatically identifying and recommending content that may be of interest to a user can greatly enhance user browsing and entertainment watching experience.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
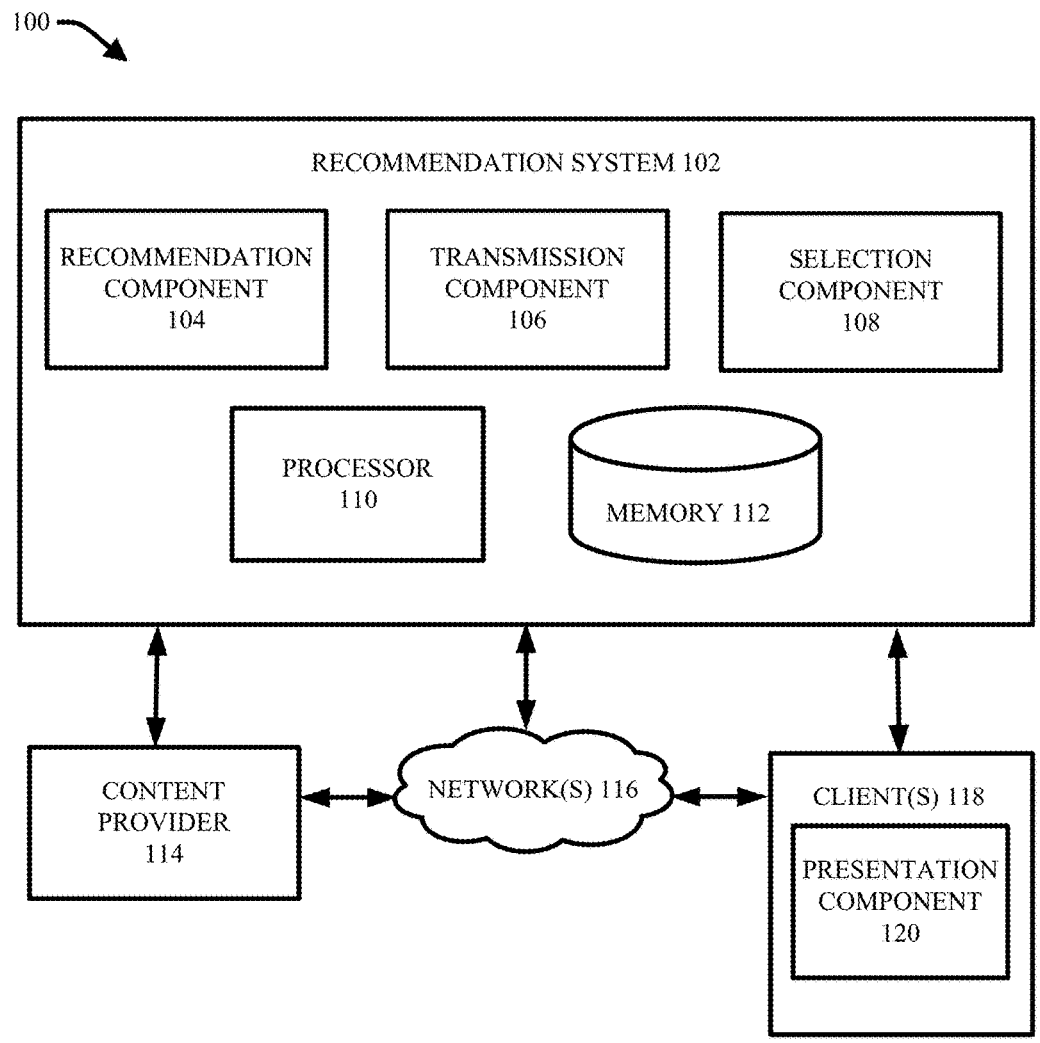
FIG. 1 illustrates an example system for recommending media based on received signals indicating user interest in a plurality of recommended media items, in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for recommending content items to a user based on received signals indicating user interest in two or more content items included in a subset of recommended content items. Networked systems that employ website platforms for content distribution often present relevant content items to users based on certain signals or indicators related to user preferences. For example, a media sharing system may present a user a list of recommended videos for watching based on the user's watch history. Users are often interested in more than just one recommended content item. However, most content distribution systems only allow a user to select one content item from a recommendation list. After selecting one of the recommended items the user will be presented with a new list of recommended items but will not have the option to browse the previously recommended items. As a result, the user may skip viewing items they may have viewed and valuable information regarding user interest in various items is wasted.

In order to remedy the above noted problems, the subject systems and methods provide users an option to select more than one content item presented in a recommendation list. For example, where a user is presented with a list of recommended videos for watching, the user can mark or tag multiple videos in the list to indicate that the user is interested in watching the videos or having them appear in a future recommendation list. In another example, the user can select one or more videos in a recommendation list to place in a watch later folder. In an aspect, videos that are marked or otherwise indicated as sparking a user's interest are presented to the user at the top of a next generated recommendation list.

Various additional mechanisms are contemplated for determining content items included in a recommendation list that a user is interested in. For example, in addition to a declared indication by a user (e.g., via marking or placing in a watch later folder), the disclosed systems can infer content items a user is interested in based on gaze detection, cursor movement, hovering over a thumbnail representation of the item, etc. Signals collected regarding user interest in multiple content items provided in a recommendation list can further influence machine learning with respect to recommendation algorithms that recommend similar content items to a user based on various signals (e.g., previously watched, user subscriptions, user preferences, user demographics, social affiliations, trending videos, etc.).

In one or more aspects, a system is provided that includes a recommendation component configured to analyze a set of videos and identify a first subset of videos to recommend to a user, wherein representations of the videos included in the first subset are presented to a user via a user interface displayed at a client device. The system further includes a selection component configured to receive input regarding user interest in two or more videos included in the first subset of videos. The recommendation component further identifies a first subset of the two or more videos for re-recommending to the user based on the received input.

In another aspect, a method is disclosed that includes using a processor to computer executable instructions stored in a memory to perform acts including receiving input indicting an interest in two or more videos included in a first subset of media items recommended to a user, and identifying a second subset of media items to recommend to the user or an other user based on the input, wherein in response to the identifying representations of the media items included in the second subset are presented as recommended to the user or the other user via a user interface displayed at a client device.

Further provided is a tangible computer-readable storage medium comprising computer-readable instructions that, in response to execution, cause a computing system to perform various operations. The operations include at least presenting a first subset of recommended videos to a user via a user interface, receiving input regarding user interest in two or more videos of the first subset of videos, and presenting a second subset of recommended videos to the user via the user interface after the presenting the first subset of recommended videos, wherein the second subset of recommended videos are identified based on the input.

Referring now to the drawings, with reference initially to FIG. 1, presented is a diagram of an example system 100 for recommending media based on received signals indicating user interest in a plurality of recommended media items, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes recommendation system 102, content provider 114, one or more networks 116 and one or more client devices 118. Recommendation system 102 can include recommendation component 104, transmission component 106, and selection component 108. Recommendation system 102 includes memory 112 for storing computer executable components and instructions. Recommendation system 102 further includes a processor 110 to facilitate operation of the instructions (e.g., computer executable components and instructions) by the recommendation system 102.

Recommendation system 102 is configured to recommend content items, such as media items (e.g., videos), to a user based on various indicators/signals. For example, recommendation system 102 can employ one or more algorithms configured to identify a subset of content items included in set of content items to recommend to a user based on various factors, including but not limited to: user preferences, user demographics, user context, user browsing history, user watch history (e.g., where the content items include videos), user listening history (e.g., where the content items include audio or music), relationships between the user and other users interacting with the content items, similarity of the user to other users interacting with the content items, popularity of content items, and popularity of content items within a cluster type of users. Recommendation system 102 can then recommend the identified content items to user. For example, recommendation system 102 can generate a list or subset of recommended content items to provide to the user via a user interface displayed at client device 118 employed by the user.

Recommendation system 102 is further configured to identify content items included in a subset of recommend content items presented to a user that the user has provided an indication of interest in. For example, when viewing a subset of recommended content items presented to a user via a user interface, the user can provide signals indicating an interest in two or more of the recommended content items. According to this example, the user may select a first recommended content item for viewing now, select a second recommended content item for viewing later, and/or select a third recommended content item for inclusion in a future recommendation list. Recommendation system 102 can use information regarding user interest in multiple content items included in a subset of recommended content items, (e.g., the first second and third content items in the example above), when generating future subsets of recommended content items for the user and/or for other users.

For example, where a user indicates an interest in multiple content items included in a subset of recommended content items, recommendation system 102 can re-recommend the multiple content items to the user in a future recommendation subset. Recommendation system 102 can develop information regarding associations between multiple content items of a recommendation subset that a user is interested in, and/or associations between the multiple content items and the user. Recommendation system 102 can then employ the information when identifying other content items to recommend to the user and/or when identifying content items to recommend to other users.

As used herein, the term content or content item refers to information that is formatted to be provided to a user in a digital medium at a computing device (e.g., client device 118) and provides substantive value to the user. Content associated with the disclosed systems includes content that can be consumed or accessed (e.g. shared) by a plurality of users. The term content can include various forms or types including text content and multimedia content. For example, text content can include written articles, books, magazines, posts, tweets or commentary. Multimedia content can include still images (e.g., pictures, photos, drawings), audio (e.g., music, sound, noise), and video (e.g., videos clips, advertisements, streaming video, full length movies, etc.). The term media item is used throughout the subject disclosure to refer to a content item that includes media or multimedia, such as a video, a song or a picture. In some aspects, the term media item is used to refer to a collection of media items such as a playlist including several videos or songs, or a channel including several videos or songs associated with a single media source.

In an aspect, content is provided to a user at client device 118 from content provider 114 over a network 116. A content provider (e.g., content provider 114) can include an entity that provides digital content to a user at client device 118 via a network 116 (e.g., the Internet). In an aspect, content provider 114 can employ one or more server computing devices to store and deliver content to users that can be accessed using a browser. For example, content provider 114 can provide content to a user via a website (e.g., a media sharing website, a social networking website, a shopping website, etc.). In an aspect, recommendation system 102 is associated with a content provider that provides streaming media to users over a network 116 (e.g., a media provider). The media can be stored in memory associated with the content provider located at various servers employed by the content provider and accessed via client device 118 using a website platform of the media provider. For example, content provider 114 can include a media presentation source that has access to a voluminous quantity (and potentially an inexhaustible number) of shared media (e.g., video and/or audio) files. The media presentation source can further stream these media files to one or more users at respective client devices of the one or more users over a network 116.

Other example content providers configured to provide digital content to a user over network can include but are not limited to: an entity that provides social networking services and information, an entity that compiles photos and/or links to information found interesting to users at various websites, an entity that provides news articles and news multimedia, an entity that complies photos, an entity that compiles written reviews of places and things, or an entity that provides products for purchasing.

It should be appreciated that the types of content providers described above are merely exemplary and that recommendation system 102 (and additional systems described herein) can be employed with a vast array of content providers providing various types of content. Recommendation systems described herein are primarily exemplified in association with a content provider configured to provide streaming video to client device 118 over a network 116 (e.g., a media provider). Accordingly, the recommendation systems will be primarily described in association with recommending sets of media items, receiving information regarding user interest in multiple media items included in a set of recommended media items, and employing that information when identifying additional sets of media items to recommend to the user or other users. However, it should be appreciated that recommendation systems described herein can be used to recommend sets of various types of content (e.g., advertisements, catalogue items for purchase, social posts, etc.), gathering information regarding user interest in multiple items of a set of recommended content items presented to the user, and employing that information when identifying additional sets of content items to recommend to the user or other users.

Client device 118 can include any suitable computing device configured to interact with content provider 114 and/or recommendation system 102 to receive content and/or recommendations of content as presented to a user at the client device via a user interface displayed at the client device. For example, client device 118 can include a desktop computer, a laptop computer, a television, a mobile phone, a tablet personal computer (PC), or a personal digital assistant PDA. Client device 118 can include presentation component 120 to generate and present a user interface at the client device that organizes and presents content items associated with a content provider to a user, including recommended content items. As used in this disclosure, the terms "content consumer" or "user" refers to a person, entity, system, or combination thereof that employs system 100 (or additional systems described in this disclosure) using client device 118.

Network(s) 116 can include wired and wireless networks, including but are not limited to, a cellular network, a wide area network (WAD, e.g., the Internet), a local area network (LAN), or a personal area network (PAN). For example, client device 118 can communicate with content provider 114 and/or recommendation system 102 (and vice versa) using virtually any suitable and desired wired or wireless technology, including, for example, cellular, WAN, wireless fidelity (Wi-Fi), Wi-Max, WLAN, etc. In an aspect, one or more components of system 100 are configured to interact via disparate networks. For example, client device 118 can access and receive content from content provider 114 over a LAN while recommendation system 102 can communicate with a content provider 114 over a WAN.

In an aspect, content provider 114 can include recommendation system 102 (e.g., content provider 114 can communicate directly with recommendation system 102) and client device 118 can be configured to access content provider 114 including the recommendation system 102 via a network 116. In yet another aspect, client device 118 can include one or more components of recommendation system 102. According to this aspect, recommendation system 102 can identify and recommend locally stored content and/or content associated with a content provider 114 accessed via client device 118 over a network 116.

Recommendation system 102 includes recommendation component 104 to identify subsets of content items (e.g., media items) to recommend to a user from a set of content items. For example, recommendation component 104 can identify a subset of videos to recommend to a user from a set of millions of videos using various algorithms that consider factors including but not limited to: user preferences, user demographics, user context, user browsing history, user watch history (e.g., factors that identify videos having similarities to previously watched or liked videos), relationships between the user and other users interacting videos included in the set, similarity of the user to the other users, popularity of respective videos in the set, and/or popularity of respective videos included in the set with respect to a cluster/type of users.

Recommendation component 104 is further configured to identify two or more content items included in a subset of recommend content items provided to a user (e.g., using transmission component 106) that the user has provided an indication of interest in. Selection component 108 is configured to monitor, receive, and interpret user input regarding indications of interest in recommended content items. Recommendation component 104 can use information regarding user interest in multiple content items included in a subset of recommended content items to identify additional subsets of recommended content items for the user and/or for other users.

In particular, recommendation component 104 can be configured to routinely identify new subsets of media items to recommend to a user in a dynamic fashion as indicators of user interest change. For example, recommendation component 104 can be configured to identify a new subset of recommended videos or channels each time a user selects and watches a video or channel. In another example, recommendation component 104 can be configured to identify a new subset of recommended videos or channels each time a user returns to or refreshes an interface that presents media items associated with a set of media items offered by a media provider. In view of the above example, recommendation component 104 can use information regarding user interest in multiple content items included in a current or past subset of recommended content items to identify content items to include in future subsets of recommended content items. For example, recommendation component 104 can re-recommend content items to a user in a future subset of recommended content items based on user input indicating interest in the content items received when the content items are included in a past or current subset of recommended content items. In another example, recommendation component 104 can gather information regarding user preferences in general and relationships between recommended items based on user input indicating interest in certain recommended content items. Recommendation component 104 can further employ the information to fine tune recommendations for the user and to influence recommendations for other users.

Recommendation system 102 includes transmission component 106 to transmit or provide (e.g., via a network 116) information representing subsets of content items identified by recommendation component 104 to client device 118 for presentation to the user of the client device via a user interface. For example, client device 118 can include presentation component 120 to generate a user interface for presenting and organizing content items, provided by content provider 114, to a user. In particular, the interface can present a user with information regarding various content items available for viewing, purchasing, playing, etc., by displaying text representing the respective content items, insignia representing the respective content item, images representing the respective content items or other objects that serve as representations of content items. The user interface can present information representing subsets of recommended content items. For example, where a subset of recommended content items includes videos or channels, the presentation component can present a list or grid view of thumbnails representative of the respective videos or channels.

In an aspect, presentation component 120 is configured to present media items to a user, provided by a media provider (e.g., wherein content provider 114 is a media provider), via a user interface associated with the media provider. For example, recommendation system 102 can configure a user interface for display at client device 118 that facilitates organizing and presenting media content provided by the media provider. Transmission component 106 can transmit information indicating media items for presenting via the user interface, including information indicating subsets of recommended media items identified by recommendation component 104 as discussed herein. Presentation component 120 of client device 118 can generate and/or display the user interface and present the media items in various forms and arrangements.

For example, presentation component 120 can display a user interface that includes a section or area having information representing recommended media items. In another example, presentation component 120 can organize representations (e.g., thumbnails, images, etc.) of the recommended media items in an order that reflects a predicted relative user interest level in the respective media items. Presentation component 120 can also organize or mark recommended media items to indicate that whether the media items have been previously recommended to the user. In another example, presentation component 120 can also generate an area on a user interface that organizes and presents media items selected by a user for watching later.

Figure 2:
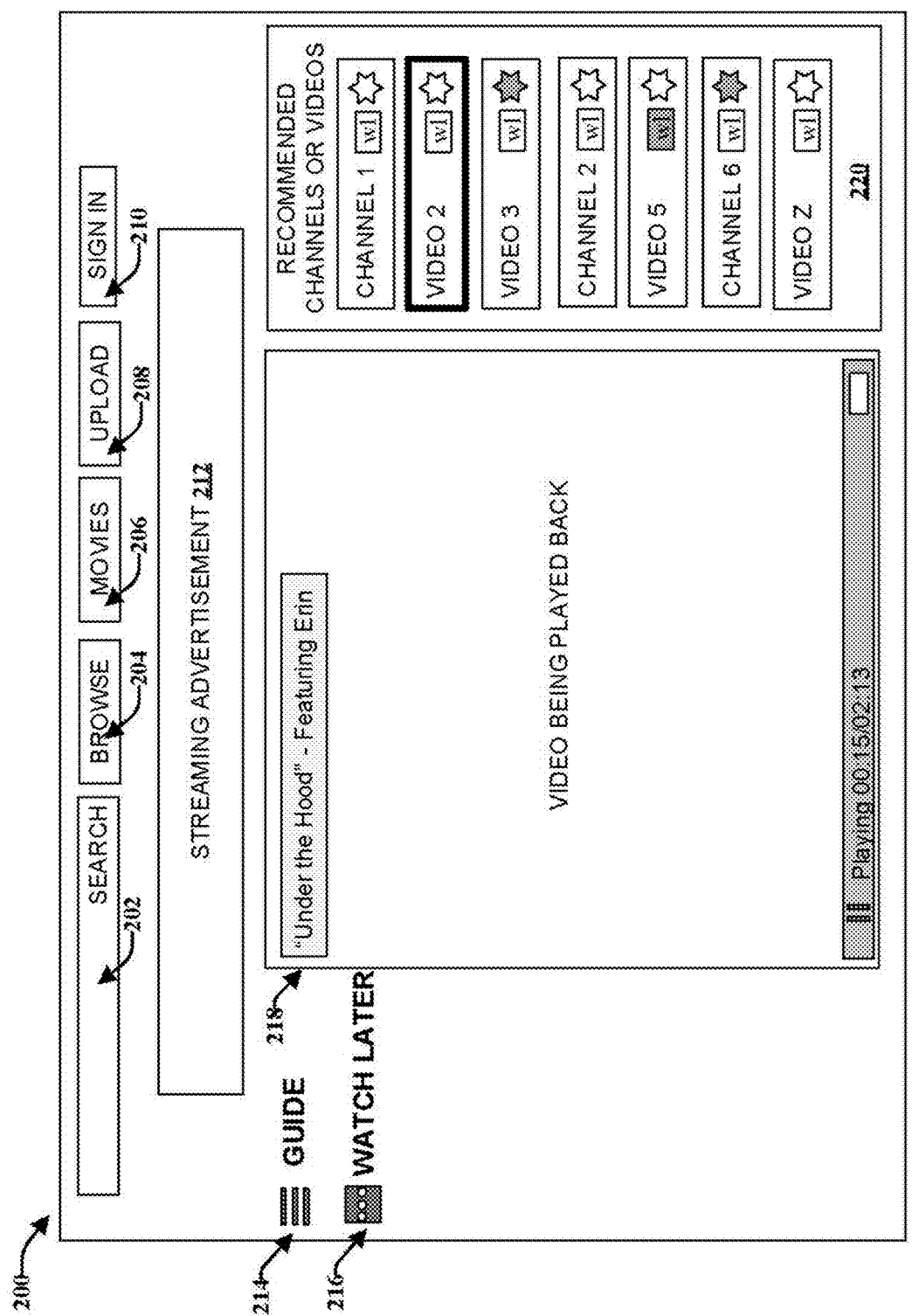
FIG. 2 presents an example user interface that facilitates presenting recommended media items and facilitates receiving user input regarding user interest in the recommended media items, in accordance with various aspects and embodiments described herein.
Figure 3:
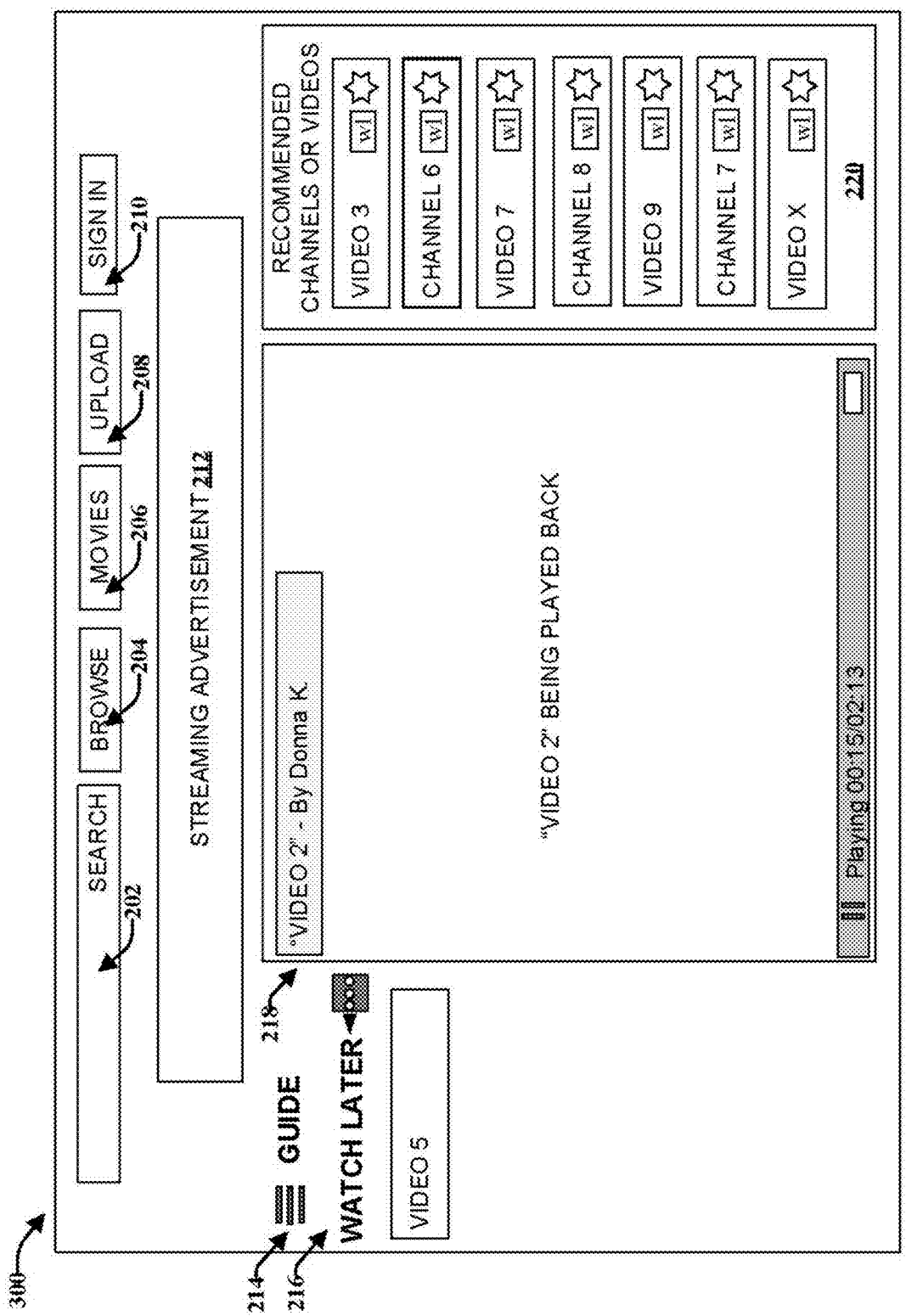
FIG. 3 presents another example user interface that facilitates presenting recommended media items and facilitates receiving user input regarding user interest in the recommended media items, in accordance with various aspects and embodiments described herein.
Figure 4:
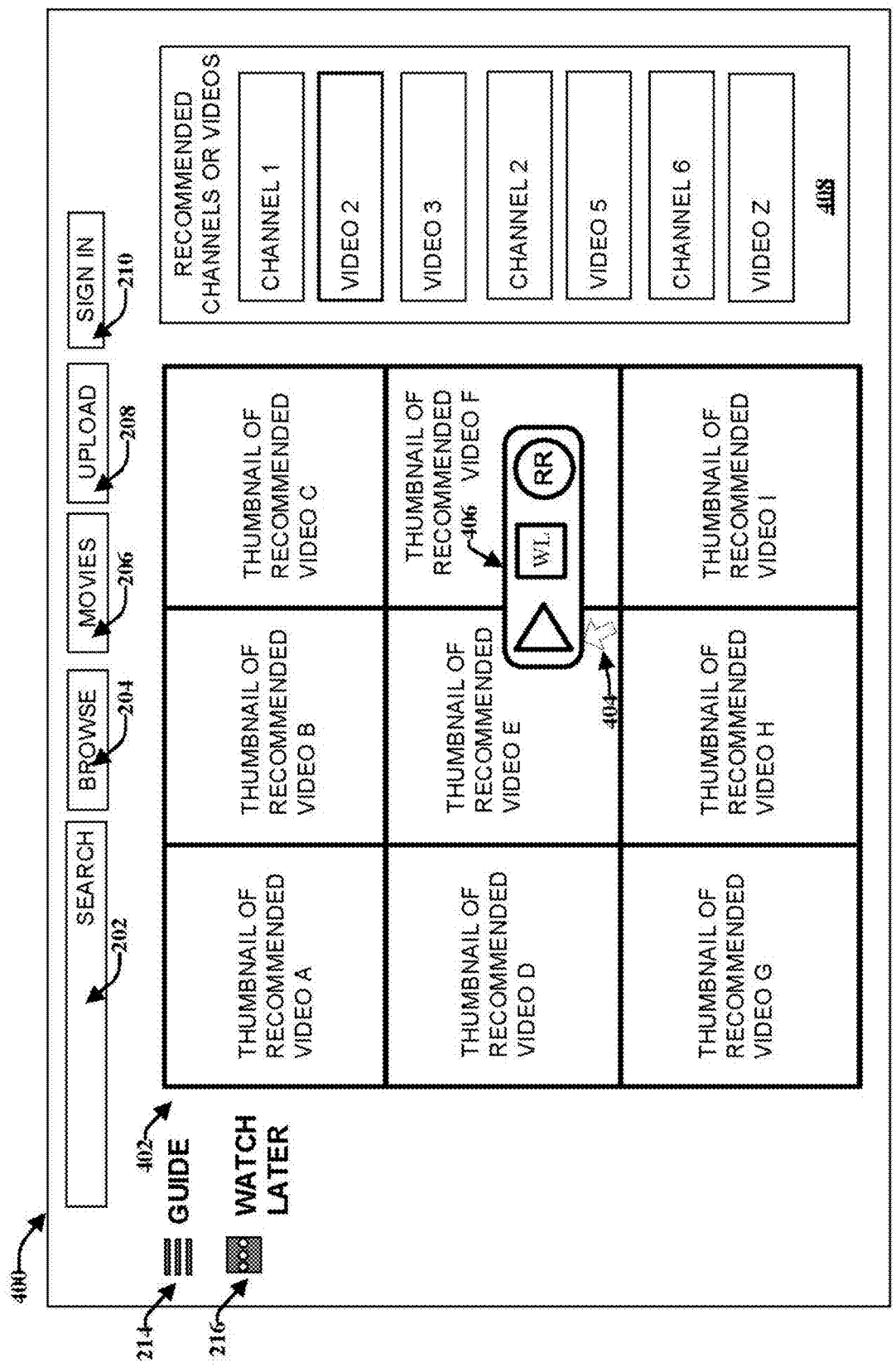
FIG. 4 presents an example user interface that facilitates presenting recommended media items and facilitates receiving user input regarding user interest in the recommended media items, in accordance with various aspects and embodiments described herein.

In an aspect, presentation component 120 can further generate/provide tools associated with the user interface that facilitate receiving input regarding user interest in a set of recommended content items. For example, presentation component 120 can generate interactive prompts associated with a subset of recommended media items that allow a user to provide input regarding interest in respective media items included in the subset. For example, presentation component 120 can generate an interactive prompt that allows a user to indicate: a level of interest in one or more of the recommended media items, whether the user desires to view a recommended media item now, whether the user desires to view one or more of the recommended media items later, or whether the user desires to have one or more of the recommended media items re-recommended to the user in a future recommended subset of media items. FIGS. 2-4, discussed infra, present example user interfaces generated/displayed by presentation component 120 that facilitate viewing and interacting with media content, including recommended media content.

Presentation component 120 can present content viewing options for use with any suitable type of device configured to interface with a streaming media provider, for example mobile phone, tablet computer, desktop computer, server system, personal computers, cable set top box, satellite set top box, cable modem, television set, internet-enabled televisions, television computer device media extender device, video cassette recorder device, blu-ray device, DVD (digital versatile disc or digital video disc) device, compact disc device, video game system, audio/video receiver, radio device, portable music player, navigation system, car stereo, etc.

The respective devices listed above (and additional devices suitable for interfacing with a streaming media provider) often have different capabilities and limitations (e.g., screen size, decoders . . . ). In an aspect, presentation component 120 can provide presentation options in accordance with different device capabilities or limitations. For example, data rendering capabilities may be more limited in a mobile device (e.g., a smart-phone) than in a fixed computing device (e.g., a desktop computer), more effort may be required of a user to consume content such as a video (or other information) from the mobile device than would be required of the user in viewing the same video from a fixed computing device. In addition, because displays of various mobile devices are often smaller than displays in fixed computing devices, it may be possible only to display a relatively small amount of information at any given time on a mobile device. Finally, data connections between a mobile device and various networked resources (e.g., the Internet) may be slower than corresponding data connections between a fixed computing device and the same networked resources. Accordingly, presentation component 120 can generate user options to account for variations in device functionality and available bandwidth for consumption and rendering of media content.

In view of the above, presentation component 120 can present content in various formats and/or in accordance with various display mediums. In particular, presentation component 120 can adapt and optimize display of options and content based on respective client devices. For example, presentation component 120 can adapt the manner in which subsets of videos or channels recommended for the user are presented at client device 118 based on client device 118 capabilities and display restrictions. In another example, presentation component 120 can present a section of video in a format such as H.263, H.264 AVC, MPEG-4 SP, VP8, or other suitable format based on the client device 118. In yet another example, presentation component 120 can present an audio of a video in formats such as for example AAC LC/LTP, HE-AACv1 (AAC+), HE-AACv2 (enhanced AAC+), AMR-NB, AMR-WB, FLAC, MP3, MIDI, Vorbis, PCM/WAVE, etc.

In an aspect, presentation component 120 can automatically configure or present user options to consume video based on encoding parameters such as video resolution, video frame rate, video bit rate, video codec, audio codec, audio channels, audio bit rate, etc. Thus presentation component 120 can choose a format to consume content that best suits capabilities of specific consumption mediums, available bandwidth, file size, processing capabilities, screen resolution, screen size, available encoders, available decoders, etc.

Selection component 108 is configured to monitor, receive, and interpret user input associated with a user interface at which a subset of recommended content items is presented. In particular, selection component 108 can monitor, receive, and interpret user input that indicates an interest in one or more of the recommended content items. Previous systems merely allowed a user to select one content item from a list of recommended content items. However, using selection component 108, recommendation system 102 can receive input indicating user interest in several (e.g., more than one) content items included in a recommendation list.

For example, when viewing a subset of recommended media items, a user may select a first one of the recommended media items for viewing now, however the user may also be interested in viewing other media items included in the subset. According to this example, selection component 108 can allow a user to indicate other media items included in a subset of recommended media items that the user would like to see in a future recommendation list/subset and/or other media items included in the subset of recommended media items that the user would like to save in a watch later folder. In an aspect, where a user indicates he/or would like to have a media item re-recommended, recommendation component 104 can include that content item in a subsequently identified subset of recommended media items. For instance, after viewing the media item selected for viewing now, recommendation component 104 can identify a new subset of recommended media items that includes the other media items the user indicated an interest in having re-recommended.

The phrase "user input indicating interest in a recommended content item" covers a wide range of potential user input, including expressed and implied input indicating interest in recommended content as received/interpreted using a variety of input devices associated with client device 118 at which recommended media items are presented to a user via a user interface.

Expressed input that indicates user interest in a recommended content item includes an action by a user that the user knows will be interpreted by recommendation system 102 as an indication of user interest in the recommended content item. For example, such expressed input can include but is not limited to: a request to select or play a recommended media item, a request to add a recommended media item to a watch list or watch later list, application of a tag or mark to a recommended media item that indicates user interest in the media item, or application of a tag or mark to a media item that indicates a request to have the media item re-recommended (e.g., so that it is included in a future generated subset of recommended media items). In an aspect, a user can provide information associated with a recommend media item that indicates not only that the user is interested in the media item, but a level of user interest in the media item. For example, a user can rate a recommended media item (e.g., using a plus or minus scale or using a score based scale) to indicate a level of interest in the media item.

Selection component 108 can receive expressed input indicating user interest in a recommended content item in response to user input using various input mechanisms and tools. For example, presentation component 120 can present input widgets or selection tools associated with recommended media items on a user interface that allow a user to select a command to play a recommended media item, mark a recommended media item with insignia of user interest, move a recommended media item to a watch list or watch later list, or tag a recommended media item with an indication to have the media item re-recommended. Using a mouse or touch screen input device (or other suitable input device associated with client device 118), a user can apply the above noted input widgets or selection tools to recommended media items to indicate an expressed interest in the recommended media items.

In another example, selection component 108 can be configured to receive and interpret such above noted input commands from various input devices associated with client device 118, including voice recognition devices, gesture based input devices, gaze recognition devices, positional sensor input devices, etc. For example, selection component 108 can be configured to receive and/or interpret voice commands indicating expressed user interest in recommended media items such as command stating "re-recommend recommended video #5" or "put recommended video #3 in my watch later folder." In another example, selection component 108 can interpret certain gestures as input commands to have a recommended media item be played, marked for re-recommending, marked as interesting to the user, or placed in a watch later folder.

Implied input that indicates user interest in a recommended content item includes an action by a user that the user knows does not necessarily know will be interpreted by recommendation system 102 as an indication of user interest in the recommended content item. For example, such implied input can include but is not limited to: hovering over thumbnail of a media item (e.g. using a curser, a finger, a stylus, or virtual indicator) for a predetermined period of time, gazing at a thumbnail or representation of a recommended content item for a predetermined period of time (e.g., where selection component 108 and/or client device is configured to receive and interpret eye movement to identify objects focused upon by a user), or repeatedly scanning back to a particular recommended content item.

It should be appreciated that various additional forms of expressed or implied user input can be received and interpreted by selection component 108 as an interest (or disinterest) in a recommended content. For example, interaction with a recommended content item in any way by a user can be interpreted as an indication of interest in the recommended content item. Such interaction could include marking a recommend media item as liked, viewing a description of the recommended media item, sharing a recommended media item, posting a recommended media item, adding a recommend media item to a playlist, or subscribing to a recommended media item. In another aspect, selection component 108 can be configured to receive and interpret user indications of disinterest in certain recommended content items. For example, selection component 108 can interpret expressed or implied indications by a user not to have a media item re-recommended In an aspect, in response to received input that reflects an input command, selection component 108 is configured to effectuate a response ignited by the input command. For example, in response to a request to play a media item, selection component 108 can direct recommendation system 102 and/or content provider 114 to play the media item. In another example, in response to a request to place a media item in a watch later folder, selection component 108 can cause the media item to be placed in the watch later folder. In yet another example, in response to command to apply a tag to a media item indicating an interest in the media item or indicating a desire to have the media item re-recommend, selection component 108 can cause the tag to be applied and inform recommendation component 104 of the application of the tag.

In addition, selection component 108 can provide information regarding user interest in one or more recommended content items included in a subset of recommended content items to recommendation component 104. As noted above, recommendation component 104 can employ the information when identifying additional media items to recommend to the user or other users. In particular, recommendation component 104 can identity one or more recommended content items included in a subset of content items that a user has indicated an interest in based on user input received by selection component 108. The recommendation component 104 can then identify additional content items to recommend to the user and/or other users based in part on the one or more identified content items.

For example, recommendation component 104 can identify and include the one or more identified content items in a subsequent recommendation list/subset for the user. In other words, recommendation component 104 can re-recommend content items included in a subset of content items that a user has provided an indication of interest in. In one aspect, recommendation component 104 can re-recommend content items included in a subset of content items that a user has indicated any form or interest in, as interpreted by selection component 108 (e.g., expressed or implied). In another aspect, recommendation component 104 can re-recommend content items marked or otherwise selected by the user for re-recommendation. For example, when viewing a subset of recommended content items, a user can provide input (that is received and interpreted by selection component 108) indicating that the user requests items #4 and #6 to be re-recommended to the user in a subsequently generated set of recommended content items. According to this example, recommendation component 104 can identify a new subset of content items to recommend to the user (e.g., based on the various factors described herein) and include the items #4 and #6 in the new subset of content items. In an aspect, recommendation component 104 can further recommend items #4 and #6 above other items included in the new subset of content items (e.g., items #4 and #6 can receive priority placement in the new subset of content items as presented to the user via a user interface).

In an aspect, recommendation component 104 can be configured to re-recommend content items, included in a first recommendation list/subset, that a user has indicated a desire in having re-recommended, by including the content items in a new recommendation list identified by recommendation component 104 immediately following the first recommendation list. The new recommendation list can be transmitted to the client device 118 for presentation to the user so that it is the next recommendation list the user is presented to the user following the first recommendation list. According to this aspect, in furtherance to the above example, a user may have selected a media item #2 for playing now and indicated that the user wants media items #4 and #6 to be re-recommended so that they appear in the next subset of recommended media items. In response, to selection of media item #2 for playing now, presentation component 120 of client device 118 can initiate playing of media item #2 via a user interface at the client device. Following initiating of playing of media item #2 (or after playing of media item #2 is complete) recommendation component 104 can identify a new subset of media items to recommend to the user (e.g., based on one or more of the various factors discussed herein) and transmission component 106 can transmit information regarding the new subset of media items to the client device 118. Recommendation component 104 can include media items #4 and #6 in the new subset. Upon receipt of the information regarding the new subset of recommended media items, presentation component 120 can present the new subset of recommended media items to the user via the user interface.

In addition to re-recommending content items, recommendation component 104 can employ information gathered regarding user interest in multiple items include in a set of recommended content items when identifying content items to recommend to the user or other users in the future. For example, recommendation component 104 can gather and store valuable information regarding recommended content items that a user expressed or implied interest in when the content items were included in a subset of recommended content items. As discussed in greater detail with respect to FIG. 6, this information can further influence machine learning with respect to adapting a recommendation algorithm that recommends content to a users based on a variety of signals (e.g., previously watched, user subscriptions, user preferences, user demographics, social affiliations, trending videos, etc.).

FIGS. 2-4 present example user interfaces for presenting and organizing media items in accordance with various aspects and embodiments described herein. The example user interfaces presented in FIGS. 2-4 facilitate presenting subsets of recommended media items and receiving user input regarding interest in one or more media items included in the respective subsets of recommended media items. The user interfaces presented in FIGS. 2-4 can be generated/provided at a client device (e.g., client device 118) via a presentation component (e.g., presentation component 120) associated with the client device. Repetitive description of like elements employed in respective embodiments of systems and interfaces described herein are omitted for sake of brevity.

With reference to FIG. 2, an example user interface 200 can include various sections such as a primary display section 218 in which a selected video is played/presented in a video player, a recommendation section 220 having views of recommended channels or videos considered relevant to a user, a channel guide 214 that can be expanded to display various categories of channels, a "Watch Later" section 216 that can be expanded or minimized to display videos and/or channels a user has selected for watching later, and a section with a streaming advertisement 212. User interface 200 can also include various menu options presented in an upper panel of the interface including a search box 202, a browse box 204, a movies box 206, an upload box 208 and sign in box 210. In some aspects videos and/or channels presented to a user in the "Watch Later" section 216 and/or recommendation section 220 can be displayed as thumbnails or in a list view. A thumbnail can include a static image of a media item that represents the media item and allows the user to select and/or preview the media item. In an aspect, a user can select a video for viewing by selecting a thumbnail view of a video and the video can be presented to the user in the primary display section 218 or a larger window of a new interface display page (as compared to the size of the thumbnail view).

By way of example, recommendation section 220 includes a set of recommended channels and videos (e.g., channel 1, video 2, video 3, channel 2, video 5, channel 6, video Z . . . ) that were identified by recommendation component 104 as described with respect to FIG. 1. In order to identify the subset of media items to include in recommendation section 220, recommendation component 104 employed a recommendation algorithm that accounts for various criteria discussed herein (e.g., user preferences, watch history, user relationships, etc.). In an aspect, the set of media items included in recommendation section 220 of interface 200 was identified by recommendation component 104 using criteria that relates to user interest in media items included in a previous subset of recommended media items (e.g., recommended based on media items that received user interest in a previous subset of recommended media items, or media items included in a previous subset of recommended media items that the user requested to have re-recommended, etc.).

A user can interact with interface 200 in various manners to navigate media content and select media content for viewing. For example, using a mouse, touch screen, voice command or other input mechanism, a user can select a media item from the list of recommended media items included in recommendation section 220. The bolded box around video 2 included in recommendation section 220 indicates that video 2 has been selected by a user for playing.

Interface 200 further allows a user to identify media items included in recommendation section 220 that the user desires to have re-recommended and/or saved for watching later. For example, as seen in interface 200, the various videos and channels included in recommendation section 220 can be associated with selection tools/widgets represented by icons , referred to as a Watch Later (WL) icon, and  referred to as a Re-Recommend (RR) icon. Selection of a WL icon associated with a channel or video can result in placement or association of the channel or video in the watch later section 216 of interface 200. Selection of an RR icon associated with a channel or video can cause the video or channel to appear in a new subset of recommended channels or videos identified by recommendation component 104 and provided in recommendation section 220. For example, selection of an RR icon associated with a video or channel can cause the video or channel to appear in the next list of recommended videos and/or channels displayed in recommendation section 220.

In example interface 200, a video entitled "Under the Hood" is being played in primary display section. A user has provided input associated with interface 200 that reflect interest in videos 2, video 3, video 5 and channel 6 included in recommendation section 220. In particular, the user has selected video 2 for playing, video 5 for watching later and video 3 and channel 6 for re-recommending.

FIG. 3 presents an interface 300 that can be generated or presented by presentation component 120 in response to the user input associated with interface 200. For example, as seen in interface 300, in response to selection of video 2 for playing, video 2 is played in primary display section 218 and a new subset of recommended channels and videos (e.g., channel 3, channel 6, video 7, channel 8, video 9, channel 7, video X . . . ) is identified by recommendation component 104 and provided in recommendation section 220. The new subset of recommended channels or videos includes video 3 and channel 6 which were selected by the user for re-recommendation in interface 200. The other videos and channels included in the subset of recommended videos in channels provided in recommendation section 220 can be recommended for other reasons (e.g., user preferences, watch history, etc.) evaluated by recommendation component 104 for identifying videos to recommend to a user. In an aspect, as exemplified in interface 300, videos or channels selected for re-recommendation can be provided at the top of a next generated recommendation list. In addition, video 5 selected for watching later by the user in interface 200 is now included in watch later section 216.

FIG. 4 presents another example interface 400 that facilitates presenting subsets of recommended media items and receiving user input regarding interest in one or more media items included in the respective subsets of recommended media items. Interface 400 includes similar aspects of interfaces 200 and 300. For example, interface 400 includes a watch later section 216, a primary display section 402 and a recommended channels or videos section 408. Recommended channels and videos section 408 can include a subset of channels and videos identified by recommendation component 104 (e.g., using one or more of the criteria discussed herein). In addition, primary display section 402 can include a thumbnail view of recommended videos or channels identified by recommendation component 104. For example, a video can be played in primary display section 402 following selection of the video for playing. After the video has been stopped or completed playing, primary display section 402 can display a thumbnail view of recommended videos identified by recommendation component 104 (e.g., using one or more of the criteria discussed herein).

In an aspect, as a user moves a cursor 404 (or other input indicator such as a finger, stylus, virtual indicator, etc.) over a thumbnail of a recommended video included in primary display section 402, an overlay dialogue box 406 can be generated in association with the thumbnail. The dialogue box can provide selection options associated with the video represented by the thumbnail. For example, dialogue box 406 includes a triangle icon that can be selected to play the video, a square WL icon that can be selected to have the video saved in watch later section 216, and a circle RR icon that can be selected to have the video re-recommended to the user in a subsequently generated recommendation list. Videos selected for re-recommendation can be presented to the user in a subsequently generated subset of recommended videos displayed in primary display section 402 and/or recommended channels or videos section 408.

In an aspect, videos or channels included in a subset of recommended videos or channels provided in primary display section 402 and recommended channels or videos section 408 can include videos or channels recommend by recommendation component 104 for different reasons. For example, recommended channels or videos included in section 408 can include only videos or channels selected for re-recommendation by a user while videos or channels presented in primary display section 402 can include videos and channels recommended to the user based on a variety or recommendation criteria (and vice versa).

Figure 5:
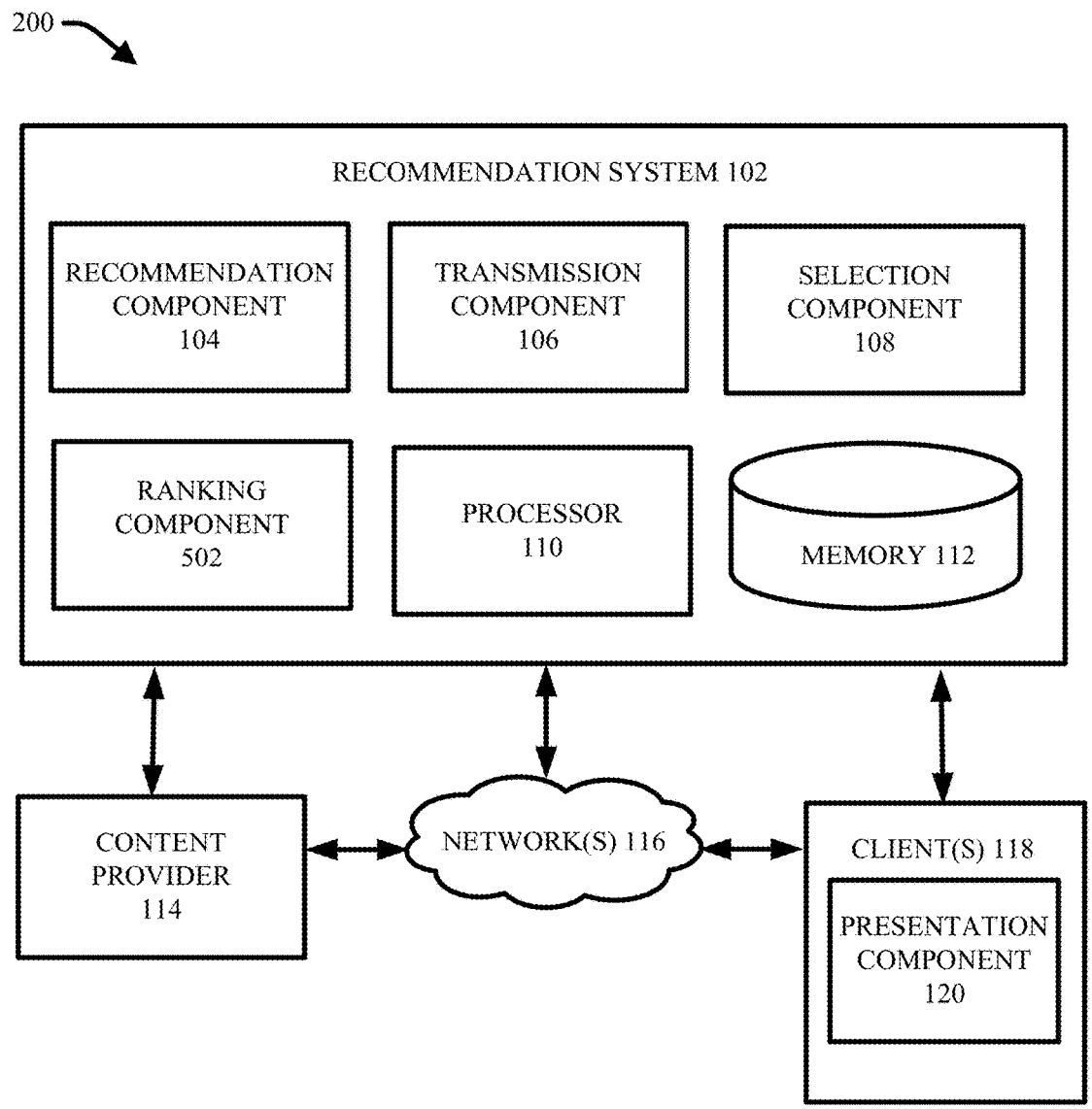
FIG. 5 illustrates another example system for recommending media based on received signals indicating user interest in a plurality of recommended media items, in accordance with various aspects and embodiments described herein.

Referring now to FIG. 5, presented is a diagram of another example system 500 for recommending media based on received signals indicating user interest in a plurality of recommended media items, in accordance with various aspects and embodiments described herein. System 500 includes same features and functionalities of system 100 with the addition of ranking component 502. Repetitive description of like elements employed in respective embodiments of systems and interfaces described herein are omitted for sake of brevity.

Recommendation system 102 can include a ranking component 502 to facilitate identifying content items for recommending to a user and ordering the manner in which recommended content items are to be presented to the user. As discussed supra, recommendation component 104 can apply various criteria when identifying content items to recommend to a user. For example, where the content items include media items (e.g., video, audio, channels, playlists, etc.), recommendation component 104 can analyze a set of videos to identify a subset of videos to recommend to the user based on various criteria, including but not limited to: user preferences, user demographics, user context, user browsing history, user watch history, relationships between the user and other users interacting with the media items, similarity of the user to other users interacting with media items, popularity of certain media items, and popularity of media items within a cluster type of users. Recommendation component 104 can further analyze the set of media items based on information related to expressed or implied user interest in previously recommended media items.

The various criteria employed by recommendation component 104 to identify content items for recommending to a user, either alone or in combination, relate to an inferred degree of user interest in a media item. These criteria are referred to herein as user interest factors. In particular, using one or more user interest factors, recommendation component 104 can filter a set of content items to identify a subset of content items that recommendation component 104 considers having a high probability of being selected by a particular user. It should be appreciated that certain content items can be associated with a greater inferred level of user interest than other content items for a given user and a given query/recommendation list generation event. In this respect, ranking component 502 is configured to associate ranking information with content items, based on various user interest factors to reflect an inferred level of user interest in the respective content items. Recommendation component 104 can identify content items to include in a subset of recommended content items based on ranking information associated with the respective content items. For example, recommendation component 104 can identify content items associated with ranking information that surpasses a predetermined threshold. In another example, ranking component 502 can identify the top N (where N is an integer) content items having the highest ranking information associated therewith to recommend to a user. In another aspect, recommendation component 104 can order content items included in a subset of recommended content items for presentation to a user based on the ranking information respectively associated therewith.

User interest factors can vary depending on the type of content items being filtered for recommendation to a user. In an aspect, where the content items include media items, user interest factors employed by recommendation component 104 and ranking component 502 to identify and rank media items based on an inferred level of user interest in the respective media items, include factors reflective of a user's preferences, factors reflective of popularity of a media item, and factors related to relationships between users.

Factors related to preferences of a user can include declared user preferences, (e.g., a specified in a user generated profile), and inferred user preferences (e.g., as gathered by recommendation system 102 based on user history interacting with a media provider affiliated with recommendation system 102). For example, recommendation component 104 and/or ranking component 502 can evaluate media items based on correlations between characteristics of the content associated with the respective media items and content having characteristics reflective of a user's preferences.

Factor reflective of popularity of a media item relate whether the media item is considered interesting to other users. For example, such indicators can include but are not limited to: number of users who viewed a media item, number of users who liked a media item, number of users who subscribed to a media item or channel associated with the media item, degree of interaction of users with a media item, number of users who created links to the media items a particular referral source, number of users that created links to the media item at multiple referral sources, number of existing links to the media item at collective referral sources, and number of users that selected a link for the media item at a referral source (e.g., followed the media item link at a referral source to view the media item at an interface associated with media provider that provides the media item). Other example of popularity of a media item can relate to recency of activity with the media item including but not limited to, recency of creation of a link or links to the media item at a referral source, and frequency of user interaction with a media item within a window of time considered recent (e.g., past 24 hours, past week, past month, etc.), including interaction at the media provider and interaction at a referral source (e.g., selection of a link to the media item).

Factors related to relationships between users are based on the assumption that like users will generally have similar interests in media content. Accordingly factors that draw conclusions based on similarities and association between users can reflect a degree of interests a user will have in a content item found interesting by a related user. For example, recommendation component 104 and/or ranking component 502 can evaluate media items to infer a degree of interest a user has in the media items based on activity with the media items (e.g., watching, liking, posting, saving in a watch later folder, requesting re-recommendation etc.) by users associated with a social circle of the user or by users who are grouped with the user based on similar preferences or demographics.

Figure 6:
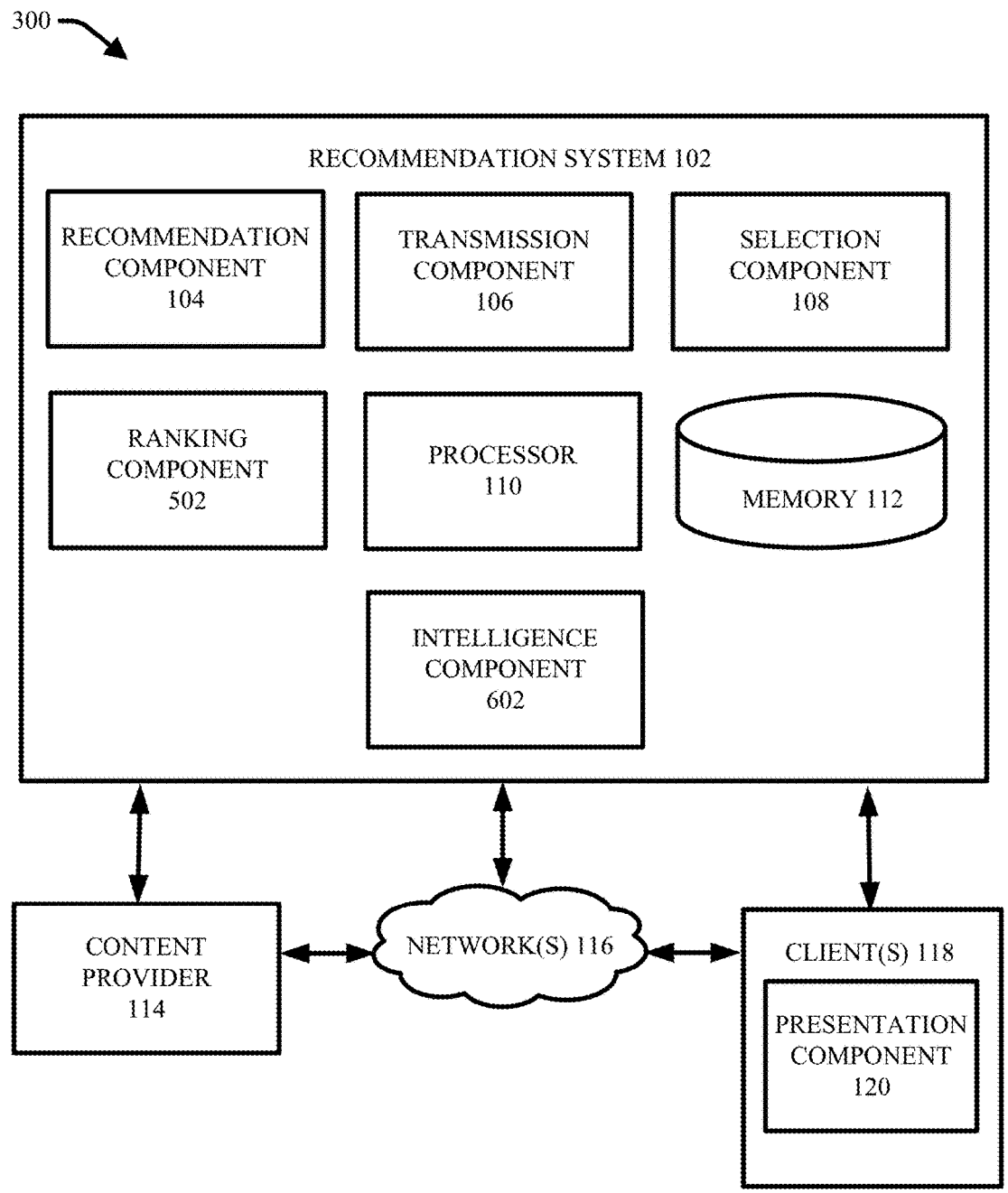
FIG. 6 illustrates another example system for recommending media based on received signals indicating user interest in a plurality of recommended media items, in accordance with various aspects and embodiments described herein.

FIG. 6 presents a diagram of another an example system 600 for recommending media based on received signals indicating user interest in a plurality of recommended media items, in accordance with various aspects and embodiments described herein. System 600 includes same features and functionalities of system 500 with the addition of intelligence component 602. Repetitive description of like elements employed in respective embodiments of systems and interfaces described herein are omitted for sake of brevity.

Intelligence component 602 is configured to provide for or aid in various inferences or determinations associated with aspects of recommendation system 102. In an aspect, all or portions of recommendation system 102 can be operatively coupled to intelligence component 602. Moreover, intelligence component 602 can be granted access to all or portions of recommendation system, content provider 114, client device 118, and other sources accessible via network 116.

In an aspect, recommendation component 104 and/or ranking component 502 can employ intelligence component 602 to facilitate inferring levels of interest a particular user has in content items included in a set of content items. Recommendation component 104 can further identify content items to recommend to the user based on the inferred level of user interest in the respective content items and ranking component 502 can associate ranking information with the respective content items based on the inferred level of user interest in the respective content items.

In another aspect, recommendation component 104 can employ intelligence component 602 to adjust/adapt recommendation algorithms employed by recommendation component 104 to account for information associated with expressed or implied user interest in multiple content items included in subsets of recommended content items. In particular, intelligence component 602 can identify patterns/correlations between recommended content items of a subset of content items that a user expressed or implied interest in, as well as patterns/correlations between recommended content items of a subset of content items that a user did not express or imply an interest in. In addition, intelligence component 602 can identify patterns/correlations between the recommended content items of a subset of content items that a user expressed or implied interest in, and/or did not express or imply and interest in, and the user. Intelligence component 602 can further evaluate such patterns/correlations associated with a large corpus of users and content items to adjust/adapt recommendation algorithms employed by recommendation component 104.

In order to provide for or aid in the numerous inferences described herein, intelligence component 602 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
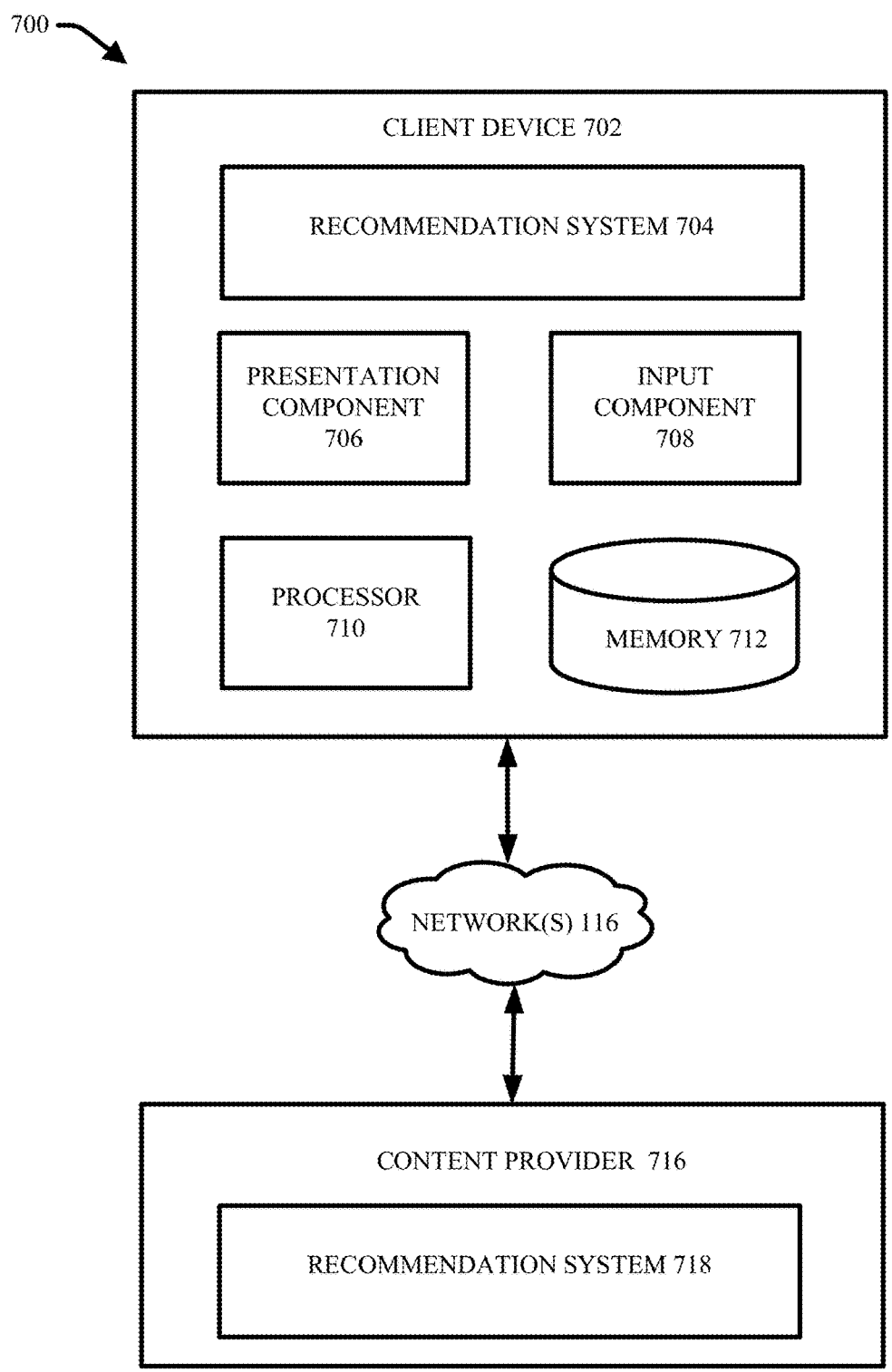
FIG. 7 illustrates another example system for recommending media based on received signals indicating user interest in a plurality of recommended media items, in accordance with various aspects and embodiments described herein.

FIG. 7 presents a diagram of another example system 700 for recommending media based on received signals indicating user interest in a plurality of recommended media items, in accordance with various aspects and embodiments described herein. System 700 includes same or similar features and functionalities of other systems described herein. Repetitive description of like elements employed in respective embodiments of systems and interfaces described herein are omitted for sake of brevity.

System 700 includes client device 702, one or more networks 116, and a content provider 716. Content provider 716 is depicted as including recommendation system 718 and client device 702 includes recommendation system 704. In an aspect, (not shown), client device 702 can be provided without recommendation system 704. Recommendation system 718 and recommendation system 704 can include one or more of the features and functionalities of recommendation system 102 (and vice versa).

In an aspect, recommendation system 718 includes a portion of the components of recommendation system 102 while recommendation system 704 includes another portion of the components of recommendation system 102. For example, recommendation system 718 can include recommendation component 104, transmission component 106, ranking component 502 and intelligence component 602 while recommendation system 704 includes selection component 108.

Client device 702 can further include presentation component 706 and input component 708. Presentation component 706 can include features and functionalities described with reference to presentation component 120. For example, presentation component 706 can generate and present a user interface at client device 120 that organizes and presents content items associated with a content provider, including recommended content items. Input component 708 facilitates user input regarding interest in content items presented in a user interface at client device 702. Input component 708 can include hardware and/or software that facilitate capturing user signals at client device 702 indicating an interest in content items displayed on a user interface at client device. For example, input component 708 can include an input device (e.g., a mouse, a touch screen, a motion sensor, a proximity sensor, a gaze detection device, etc.) and/or software that analyzes an action captured by the input device to determine either an intention of the action (e.g., select, move, etc.) or an object on the user interface which the action is directed. Client device 702 includes memory 712 for storing computer executable components and instructions. Client device 702 further includes a processor 710 to facilitate operation of the instructions (e.g., computer executable components and instructions) by client device 702.

Figure 8:
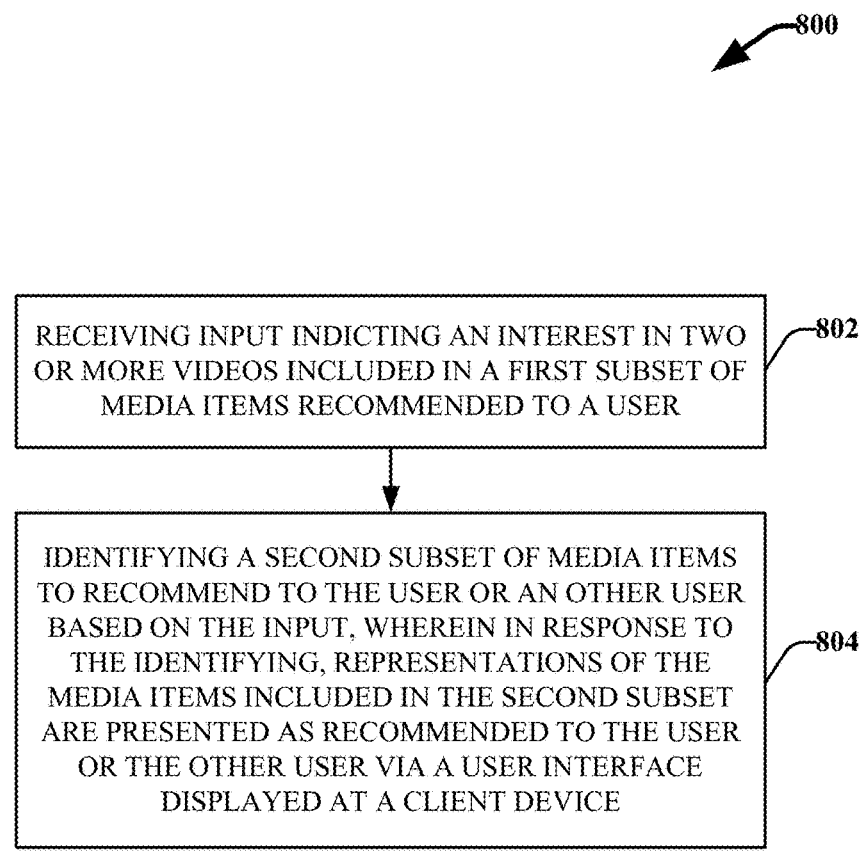
FIG. 8 is a flow diagram of an example method for recommending media based on received signals indicating user interest in a plurality of recommended media items, in accordance with various aspects and embodiments described herein.
Figure 9:
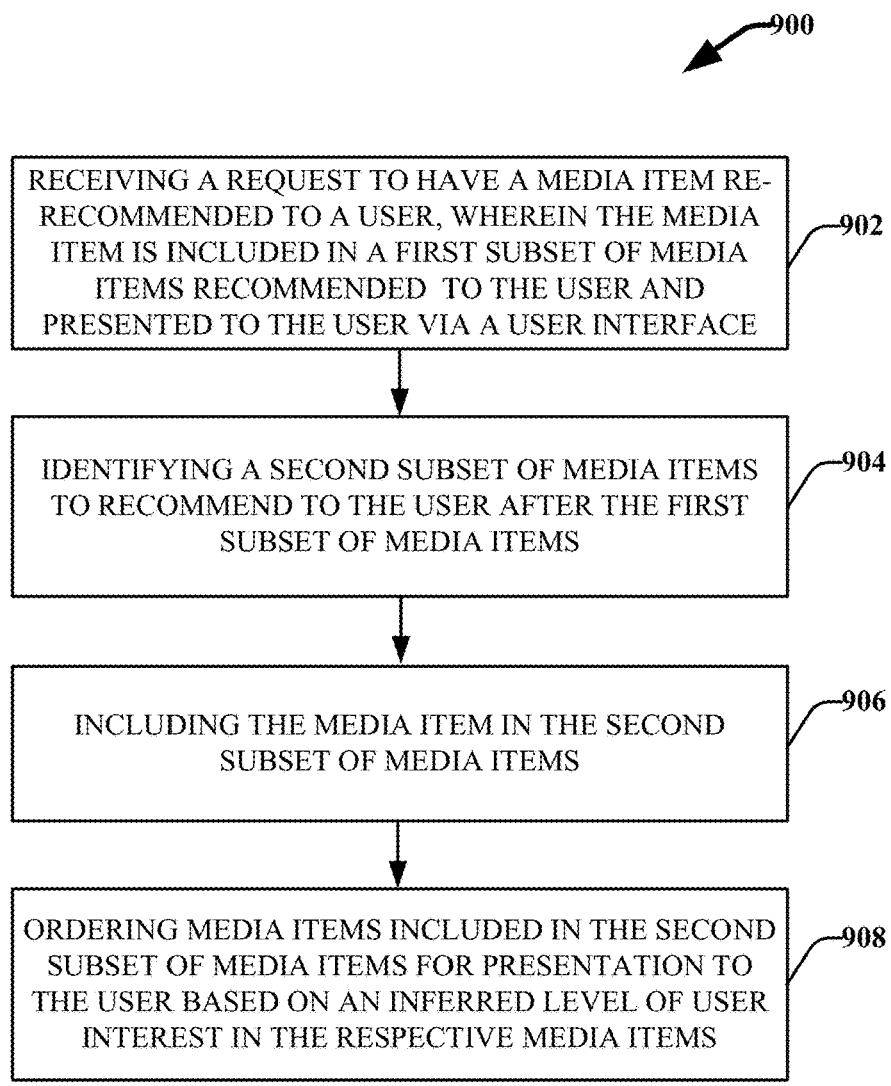
FIG. 9 is flow diagram of another example method for recommending media based on received signals indicating user interest in a plurality of recommended media items, in accordance with various aspects and embodiments described herein.
Figure 10:
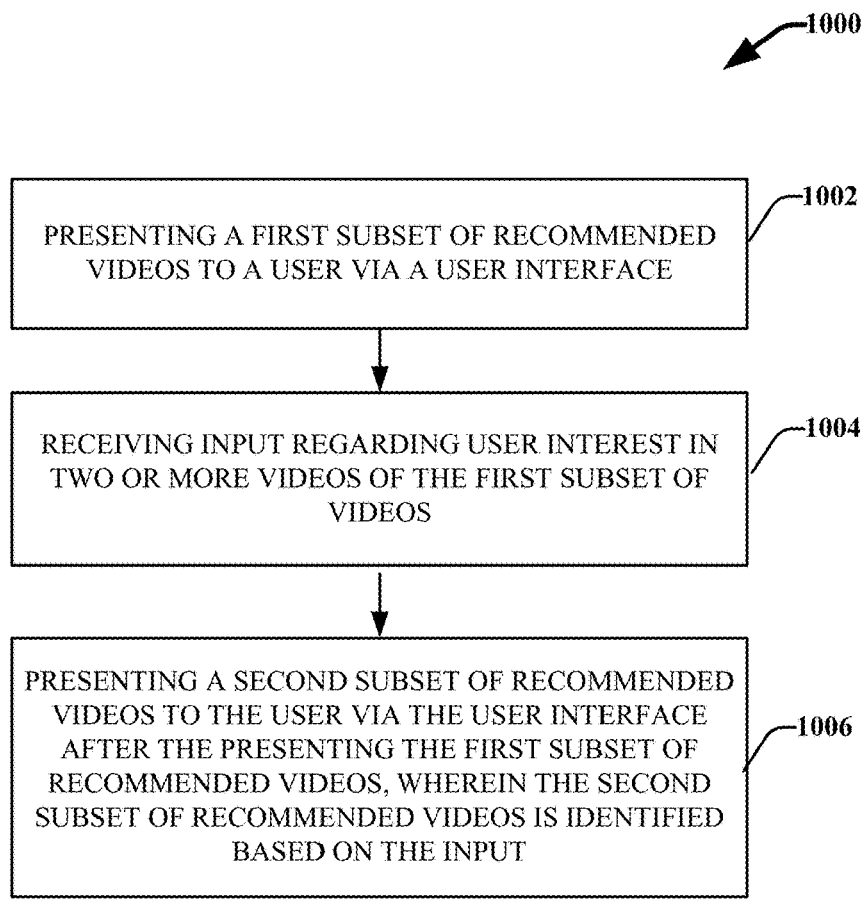
FIG. 10 is flow diagram of another example method for recommending media based on received signals indicating user interest in a plurality of recommended media items, in accordance with various aspects and embodiments described herein.

In view of the example systems and/or devices described herein, example methods that can be implemented in accordance with the disclosed subject matter can be further appreciated with reference to flowcharts in FIGS. 8-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 for recommending media based on received signals indicating user interest in a plurality of recommended media items, in accordance with various aspects and embodiments described herein. At 802, input indicting an interest in two or more videos included in a first subset of media items recommended to a user is received (e.g., using selection component 108). For example, expressed input of user interest can be received, such request to have a media item re-recommend, a request to play a media item, or a request to have a media item saved in a watch later file. In another example, implied input of user interest can be received, such as input associated with gazing at a representation (e.g., a thumbnail) of a recommended media item for a period of time or input associated with hovering over a representation of a recommended media item for a period of time. At 804, a second subset of media items to recommend to the user or another user is identified based on the input (e.g., using recommendation component 104). In response to identification of the second subset of media items representations of the media items included in the second subset are presented as recommended to the user or the other user via a user interface displayed at a client device.

FIG. 9 illustrates a flow chart of another example method 900 for recommending media based on received signals indicating user interest in a plurality of recommended media items, in accordance with various aspects and embodiments described herein. At 902 a request is received to have a media item re-recommend to a user, wherein the media item is included in a first subset of media items recommended to the user and presented to the user via a user interface (e.g., using selection component 108). At 904 a second subset of media items to recommend to the user after the first subset of media items is identified (e.g., using recommendation component 104.). For example, recommendation component 104 can generate a subset of recommended media items based on various criteria, including but not limited to: the user's preferences, the user's demographics, the user's watch history, trending media items, trending media items amongst users included in the user's social circle, etc. At 906, the media item is included in the second subset of media items (e.g., using recommendation component 104). At 908, the media items included in the second subset are ordered for presentation to the user based on an inferred level of user interest in the media items (e.g., using ranking component 502). In an aspect, the media item selected for re-recommendation is ordered above (e.g., given higher priority) other recommended media items included in the second subset, regardless as to whether another media item included in the second subset is associated with a greater level of user interest than the media item selected for re-recommendation.

FIG. 10 illustrates a flow chart of another example method 1000 for recommending media based on received signals indicating user interest in a plurality of recommended media items, in accordance with various aspects and embodiments described herein. At 1002 a first subset of recommended videos is presented to a user via a user interface (e.g., using presentation component 120). At 1004, input regarding user interest in two or more videos of the first subset of videos is received (e.g., using selection component 108). At 1006 a second subset of recommended videos is presented to the user via the user interface after the presenting the first subset of recommended videos, wherein the second subset of recommended videos is identified based on the input (e.g., using presentation component 120).

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 11:
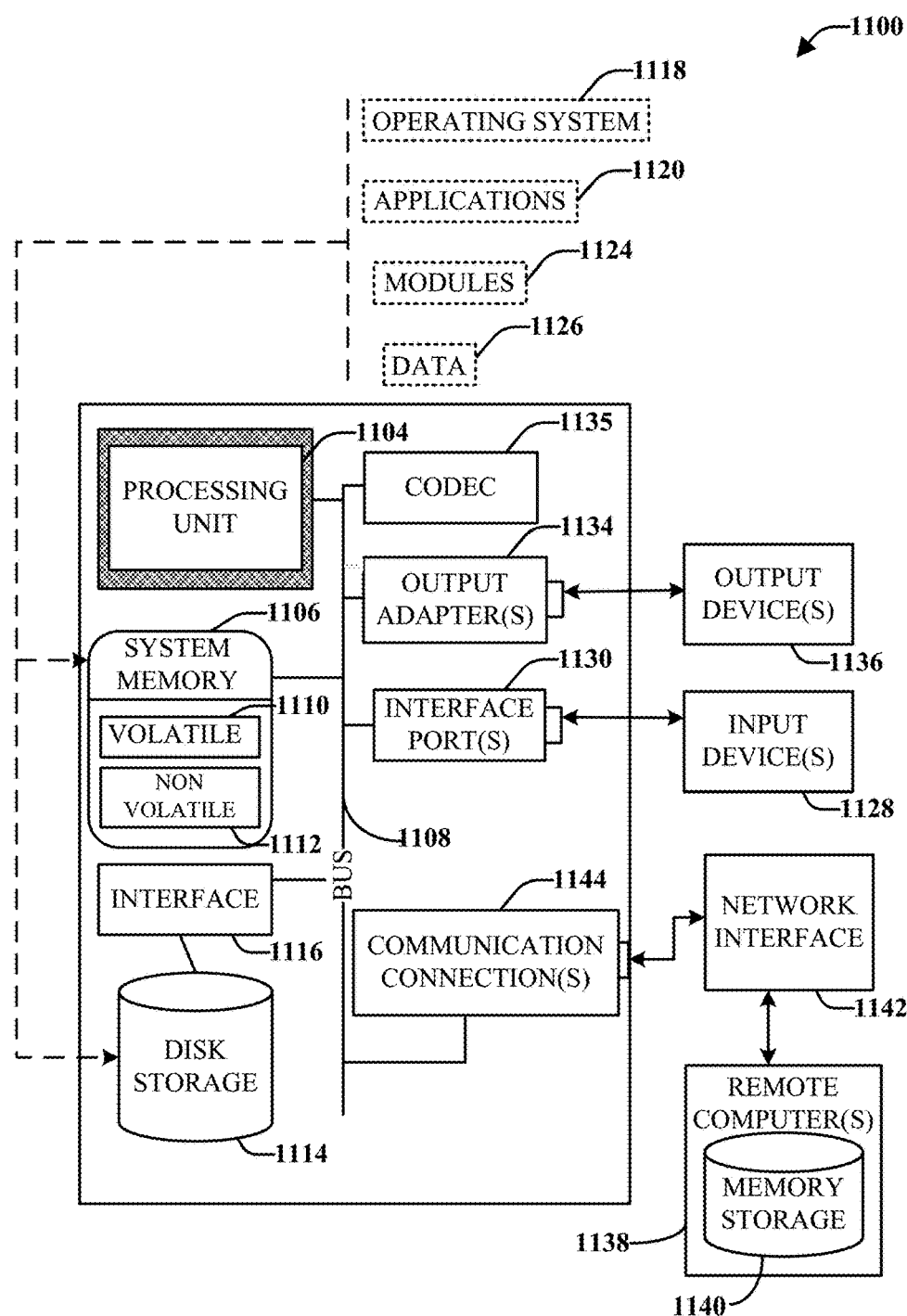
FIG. 11 is a schematic block diagram illustrating a suitable operating environment in accordance with various aspects and embodiments.

With reference to FIG. 11, a suitable environment 1100 for implementing various aspects of the claimed subject matter includes a computer 1102. The computer 1102 includes a processing unit 1104, a system memory 1106, a codec 1135, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13114), and Small Computer Systems Interface (SCSI).

The system memory 1106 includes volatile memory 1110 and non-volatile memory 1112. The basic input/output system (BIOS), containing the basic routines to transfer information between elements within the computer 1102, such as during start-up, is stored in non-volatile memory 1112. In addition, according to present innovations, codec 1135 may include at least one of an encoder or decoder, wherein the at least one of an encoder or decoder may consist of hardware, a combination of hardware and software, or software.

Although, codec 1135 is depicted as a separate component, codec 1135 may be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), or flash memory. Volatile memory 1110 includes random access memory (RAM), which acts as external cache memory. According to present aspects, the volatile memory may store the write operation retry logic (not shown in FIG. 11) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 1102 may also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or non-removable interface is typically used, such as interface 1116.

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer system 1102. Applications 1120 take advantage of the management of resources by operating system 1118 through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s). Thus, for example, a USB port may be used to provide input to computer 1102, and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices and/or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

Figure 12:
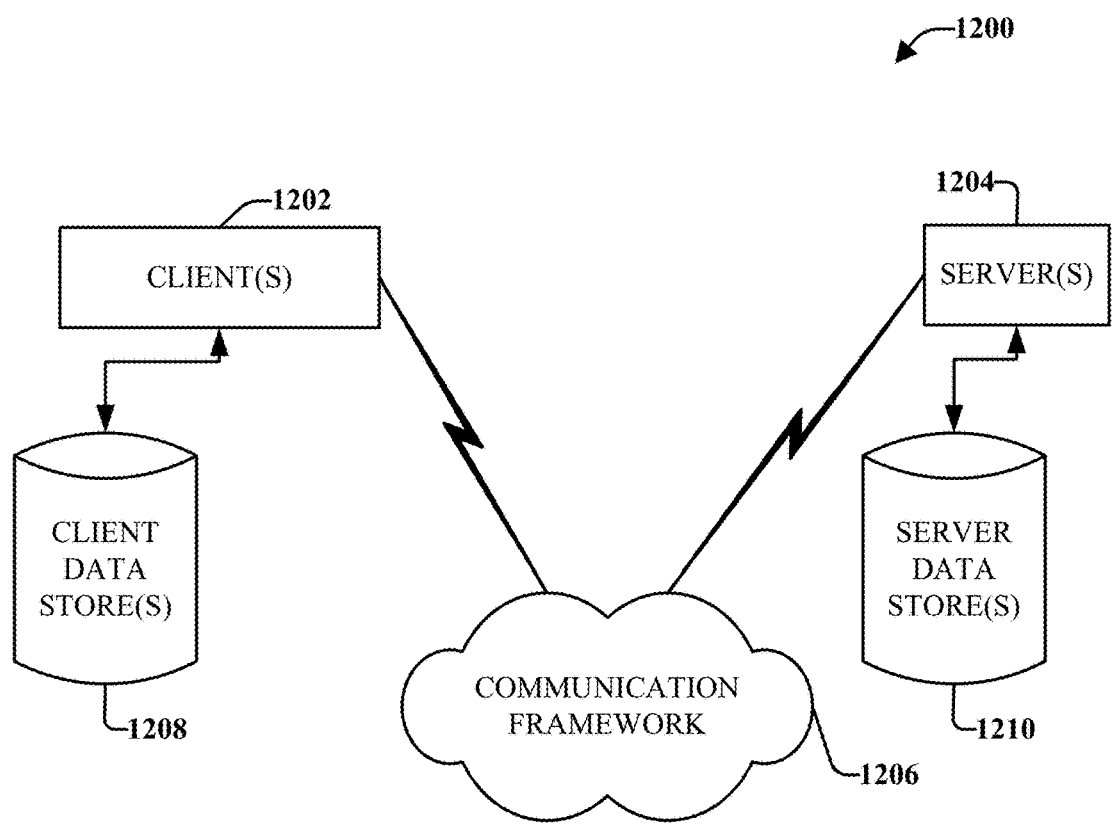
FIG. 12 is a schematic block diagram of a sample-computing environment in accordance with various aspects and embodiments.

Referring now to FIG. 12, there is illustrated a schematic block diagram of a computing environment 1200 in accordance with this disclosure. The system 1200 includes one or more client(s) 1202 (e.g., laptops, smart phones, PDAs, media players, computers, portable electronic devices, tablets, and the like). The client(s) 1202 can be hardware and/or software (e.g., threads, processes, computing devices). The system 1200 also includes one or more server(s) 1204. The server(s) 1204 can also be hardware or hardware in combination with software (e.g., threads, processes, computing devices). The servers 1204 can house threads to perform transformations by employing aspects of this disclosure, for example. One possible communication between a client 1202 and a server 1204 can be in the form of a data packet transmitted between two or more computer processes wherein the data packet may include video data. The data packet can include a metadata, e.g., associated contextual information, for example. The system 1200 includes a communication framework 1206 (e.g., a global communication network such as the Internet, or mobile network(s)) that can be employed to facilitate communications between the client(s) 1202 and the server(s) 1204.

Communications can be facilitated via a wired (including optical fiber) and/or wireless technology. The client(s) 1202 include or are operatively connected to one or more client data store(s) 1208 that can be employed to store information local to the client(s) 1202 (e.g., associated contextual information). Similarly, the server(s) 1204 are operatively include or are operatively connected to one or more server data store(s) 1210 that can be employed to store information local to the servers 1204.

In one embodiment, a client 1202 can transfer an encoded file, in accordance with the disclosed subject matter, to server 1204. Server 1204 can store the file, decode the file, or transmit the file to another client 1202. It is to be appreciated, that a client 1202 can also transfer uncompressed file to a server 1204 and server 1204 can compress the file in accordance with the disclosed subject matter. Likewise, server 1204 can encode video information and transmit the information via communication framework 1206 to one or more clients 1202.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A method comprising:
concurrently displaying, in a user interface, (i) a primary display section in which a first media content item is presented using a media player, (ii) a watch later section that includes one or more user-selected media content items in a media queue for watching at a later time, and (iii) a recommendation section that includes a first plurality of recommended media content items, wherein the first plurality of recommended media content items is identified based on user interests and based on the first media content item that is being presented in the primary display section and wherein each of the first plurality of recommended media content items is associated with a plurality of interest indication options that includes:
(i) a watch later option that, when selected, causes an associated recommended media content item from the first plurality of recommended media content items to be placed in the watch later section;
(ii) a re-recommend option that, when selected, causes the associated recommended media content item from the first plurality of recommended media content items to be included in a second plurality of recommended media content items that is subsequently identified for inclusion in the recommendation section; and
(iii) a play option that, upon selection, causes the associated recommended media content item from the first plurality of recommended media content items to be played back in the primary display section;
wherein the user interface concurrently presents the watch later option, the re-recommend option, and the play option for the associated recommended media content item;
determining that, in interacting with the user interface while the first media content item is being presented using the media player in the primary display section, a user has selected (i) the watch later option associated with a second media content item from the first plurality of recommended media content items in the recommendation section, and (ii) the re-recommend option associated with a third media content item from the first plurality of recommended media content items in the recommendation section;
in response to receiving a selection of a fourth media content item from the first plurality of recommended media content items in the recommendation section for presentation using the media player in the primary display section of the user interface, identifying the second plurality of recommended media content items based on the user interests, based on selection of the fourth media content item for presentation, and based on determining that the third media content item has been tagged for re-recommending to the user, wherein the third media content item is included in the second plurality of recommended media content items; and
concurrently displaying, in the user interface, (i) the primary display section in which the fourth media content item is presented using the media player, (ii) the watch later section that includes the one or more user-selected media content items in the media queue, wherein the second media content item is included in the media queue, and (iii) the recommendation section that includes the second plurality of recommended media content items, wherein the third media content item is included in the second plurality of recommended media content items.

2. The method of claim 1, wherein the user interests include at least one of: user preferences associated with the user, watch history associated with the user, user context associated with the user, browsing history associated with the user, user interactions with one or more media content items, and relationships between the user and other users interacting with the one or more media content items.

3. The method of claim 1, wherein the third media content item is positioned at a top position of the second plurality of recommended media content items in the recommendation section.

4. The method of claim 1, wherein the fourth media content item is selected from the first plurality of recommended media content items in the recommendation section for presentation in response to playback of the first media content item being completed.

5. A system, comprising:
a memory; and
a hardware processor that, when executing computer-executable instructions stored in the memory, is configured to:
concurrently display, in a user interface, (i) a primary display section in which a first media content item is presented using a media player, (ii) a watch later section that includes one or more user-selected media content items in a media queue for watching at a later time, and (iii) a recommendation section that includes a first plurality of recommended media content items, wherein the first plurality of recommended media content items is identified based on user interests and based on the first media content item that is being presented in the primary display section and wherein each of the first plurality of recommended media content items is associated with a plurality of interest indication options that includes:
(i) a watch later option that, when selected, causes an associated recommended media content item from the first plurality of recommended media content items to be placed in the watch later section;
(ii) a re-recommend option that, when selected, causes the associated recommended media content item from the first plurality of recommended media content items to be included in a second plurality of recommended media content items that is subsequently identified for inclusion in the recommendation section; and
(iii) a play option that, upon selection, causes the associated recommended media content item from the first plurality of recommended media content items to be played back in the primary display section;
wherein the user interface concurrently presents the watch later option, the re-recommend option, and the play option for the associated recommended media content item;
determine that, in interacting with the user interface while the first media content item is being presented using the media player in the primary display section, a user has selected (i) the watch later option associated with a second media content item from the first plurality of recommended media content items in the recommendation section, and (ii) the re-recommend option associated with a third media content item from the first plurality of recommended media content items in the recommendation section;
in response to receiving a selection of a fourth media content item from the first plurality of recommended media content items in the recommendation section for presentation using the media player in the primary display section of the user interface, identify the second plurality of recommended media content items based on the user interests, based on selection of the fourth media content item for presentation, and based on determining that the third media content item has been tagged for re-recommending to the user, wherein the third media content item is included in the second plurality of recommended media content items; and
concurrently display, in the user interface, (i) the primary display section in which the fourth media content item is presented using the media player, (ii) the watch later section that includes the one or more user-selected media content items in the media queue, wherein the second media content item is included in the media queue, and (iii) the recommendation section that includes the second plurality of recommended media content items, wherein the third media content item is included in the second plurality of recommended media content items.

6. The system of claim 5, wherein the user interests include at least one of: user preferences associated with the user, watch history associated with the user, user context associated with the user, browsing history associated with the user, user interactions with one or more media content items, and relationships between the user and other users interacting with the one or more media content items.

7. The system of claim 5, wherein the third media content item is positioned at a top position of the second plurality of recommended media content items in the recommendation section.

8. The system of claim 5, wherein the fourth media content item is selected from the first plurality of recommended media content items in the recommendation section for presentation in response to playback of the first media content item being completed.

9. A non-transitory computer-readable medium comprising computer executable instructions that, when executed by a processor, cause the processor to perform a method comprising:
concurrently displaying, in a user interface, (i) a primary display section in which a first media content item is presented using a media player, (ii) a watch later section that includes one or more user-selected media content items in a media queue for watching at a later time, and (iii) a recommendation section that includes a first plurality of recommended media content items, wherein the first plurality of recommended media content items is identified based on user interests and based on the first media content item that is being presented in the primary display section and wherein each of the first plurality of recommended media content items is associated with a plurality of interest indication options that includes:
(i) a watch later option that, when selected, causes an associated recommended media content item from the first plurality of recommended media content items to be placed in the watch later section;
(ii) a re-recommend option that, when selected, causes the associated recommended media content item from the first plurality of recommended media content items to be included in a second plurality of recommended media content items that is subsequently identified for inclusion in the recommendation section; and
(iii) a play option that, upon selection, causes the associated recommended media content item from the first plurality of recommended media content items to be played back in the primary display section;
wherein the user interface concurrently presents the watch later option, the re-recommend option, and the play option for the associated recommended media content item;
determining that, in interacting with the user interface while the first media content item is being presented using the media player in the primary display section, a user has selected (i) the watch later option associated with a second media content item from the first plurality of recommended media content items in the recommendation section, and (ii) the re-recommend option associated with a third media content item from the first plurality of recommended media content items in the recommendation section;

in response to receiving a selection of a fourth media content item from the first plurality of recommended media content items in the recommendation section for presentation using the media player in the primary display section of the user interface, identifying the second plurality of recommended media content items based on the user interests, based on selection of the fourth media content item for presentation, and based on determining that the third media content item has been tagged for re-recommending to the user, wherein the third media content item is included in the second plurality of recommended media content items; and concurrently displaying, in the user interface, (i) the primary display section in which the fourth media content item is presented using the media player, (ii) the watch later section that includes the one or more user-selected media content items in the media queue, wherein the second media content item is included in the media queue, and (iii) the recommendation section that includes the second plurality of recommended media content items, wherein the third media content item is included in the second plurality of recommended media content items.

10. The non-transitory computer-readable medium of claim 9, wherein the user interests include at least one of: user preferences associated with the user, watch history associated with the user, user context associated with the user, browsing history associated with the user, user interactions with one or more media content items, and relationships between the user and other users interacting with the one or more media content items.

11. The non-transitory computer-readable medium of claim 9, wherein the third media content item is positioned at a top position of the second plurality of recommended media content items in the recommendation section.

12. The non-transitory computer-readable medium of claim 9, wherein the fourth media content item is selected from the first plurality of recommended media content items in the recommendation section for presentation in response to playback of the first media content item being completed.

\* \* \* \* \*